July 22, 1941.   A. J. WINTLE   2,250,043
METHOD OF FABRICATING CENTERING BOLTS AND THE LIKE
Filed Dec. 4, 1939
Fig. 1
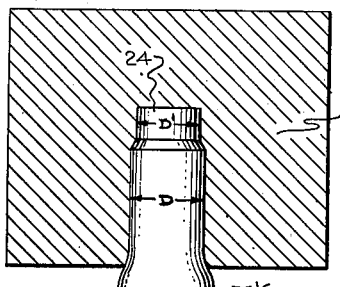
Fig. 2
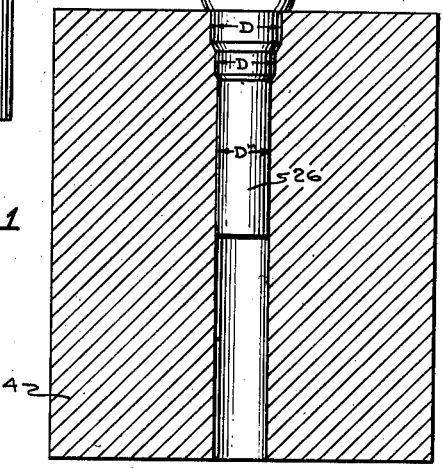
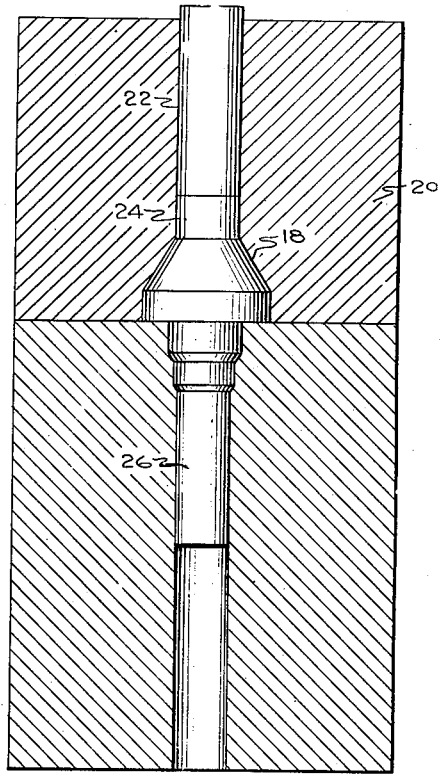
Fig. 3
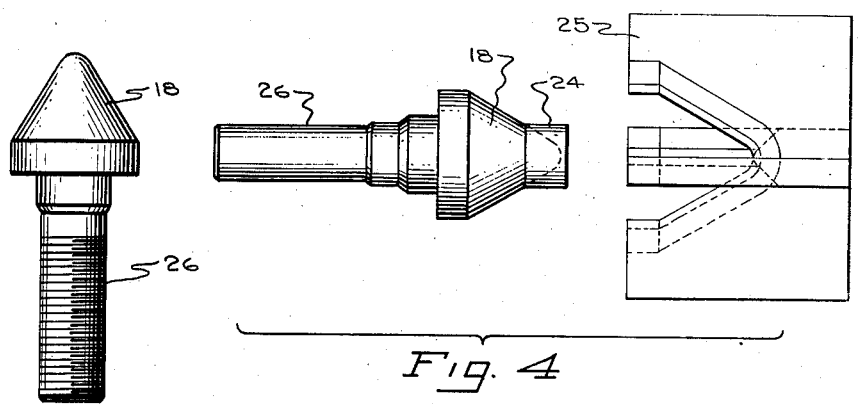
Fig. 5   Fig. 4
INVENTOR
ALFRED J. WINTLE
BY Beaman & Langford
ATTORNEYS

Patented July 22, 1941

2,250,043

UNITED STATES PATENT OFFICE 2,250,043

METHOD OF FABRICATING CENTERING BOLTS AND THE LIKE

Alfred J. Wintle, Gary, Ind., assignor to Gary Screw & Bolt Company, Gary, Ind., a corporation of Pennsylvania Application December 4, 1939, Serial No. 307,390

3 Claims. (Cl. 10—27)

The present invention relates to improvements in the method of fabricating centering head bolts and other similar structures.

In fabricating a bolt having an enlarged pointed head and a reduced shank from coiled wire and bar stock, it is too expensive to make the same upon a screw machine or other suitable metal turning machine in view of the amount of metal that must be removed by turning. If an attempt is made to cold form the pointed enlarged head along the lines of standard practice, it will be found that the metal used in such constructions will not have sufficient flow in the dies to complete the apex of the head. This difficulty has only been overcome by cold forming oversize heads and then sizing the head by turning.

For its primary object, the present invention provides a method of fabrication of centering head bolts in which a minimum amount of material is removed following the cold forming operation to finish the part. This has been accomplished through the extrusion or swaging of a portion of the blank from which the apex of the head is formed through a simple shaving and pointing operation.

A further object is to provide a method of fabricating, centering and latch bolts for automobiles in which one portion of the work blank is extruded or swaged and an adjacent portion upset in order to inexpensively fabricate a pointed head bolt.

Another object resides in the provision of a method of fabrication of metal instrumentalities, such as a bolt having an enlarged relatively pointed head and a threaded shank, in which the opposite ends of the work blanks are extruded or swaged to form the threaded shank and a protuberance from which the apex of the head is machined following the finished forming of the major portion of the head by upsetting.

These and other objects and advantages of the invention will more fully appear from a consideration of the following description and annexed claims.

In the drawing:

Fig. 1 is a side elevational view of the work blank,

Fig. 2 is a cross sectional view through the hammer and die showing the extremities of the blank reduced by extrusion or swaging and the central portion upset, Fig. 3 is a view similar to Fig. 2, showing the finishing operation upon the blank, Fig. 4 is a diagrammatic side elevational view of the blank and trimming die, and Fig. 5 is a side elevational view of a finished centering bolt.

Referring to the drawing, in Fig. 1 is shown a cylindrical work blank 10 sheared from coiled stock or otherwise provided having a diameter indicated as D. In the first operation, the blank 10 is acted upon by the hammer 12 and die 14, as shown in Fig. 2, to extrude or swage portions of the blank to the diameter D', D'' and D''' while an upset takes place at 16. For the second operation, the metal above the upset 16 in Fig. 2 is formed into the upset head portion 18 through the action of the hammers 20 and 22. The third operation involves the removal of the excess material from the extruded protuberance 24 which operation may be practically carried through presentation and relative rotation between the work piece and a pointing and shaving die 25. The excess metal in the protuberance 24 removed by the last operation is that outside of the dotted line representation of the apex of the head 18. Fig. 5 shows the finished work piece following the operation of rolling the thread upon the shank 26.

It should appear from the foregoing description that the illustrated work blank is extruded or swaged at opposite ends and upset intermediate the ends in the fabrication of the finished product. Under some conditions of size and physical properties of the finished product, only one or neither end of the work blank need be extruded or swaged with the only operation the upset of the head portion and the pointing of the protuberance to complete the head portion. Under such conditions the head portion protuberance, for example, might retain the original diameter of the coiled stock. In most cases, however, extrusion of the head portion protuberance will reduce the amount of excess metal which must be removed.

The principles of the construction heretofore disclosed are considered adaptable to all forms of fastening, latching and guiding instrumentalities having an upset head portion which in the finished product is pointed or of such reduced portion as to make the flow of metal to the desired shape difficult.

Having described my invention, what I desire to protect by Letters Patent and claim is:

1. A method of fabricating a centering head bolt from cylindrical stock comprising the steps of shearing the work blank to length, reducing the end portions thereof by extrusion or swaging to form a shank and a head portion protuberance while initially upsetting an intermediate part of the blank, completing the upsetting operation to finish the major part of a head portion tapering to the diameter of said head portion protuberance and thereafter pointing said protuberance to finish said head portion.

2. A method of fabricating instrumentalities having upset head portions of pointed configuration comprising the steps of upsetting the work blank to finish form the head portion except for a protuberance portion in the locality of the extremity of the finished head portion and thereafter removing from said protuberance metal in excess of that required to finish the extremity of said head portion.

3. A method of fabricating a centering head bolt from cylindrical stock comprising the step of shearing the work blank to length, upsetting the blank adjacent one end to finish form a head portion except for its extremity while having an end portion in the form of a protuberance upon said head portion, and thereafter removing from said protuberance metal in excess of that required to finish the extremity of the head portion.

ALFRED J. WINTLE.